April 28, 1931.  A. KAROLUS  1,802,470
SYNCHRONIZING SYSTEM
Filed May 28, 1929
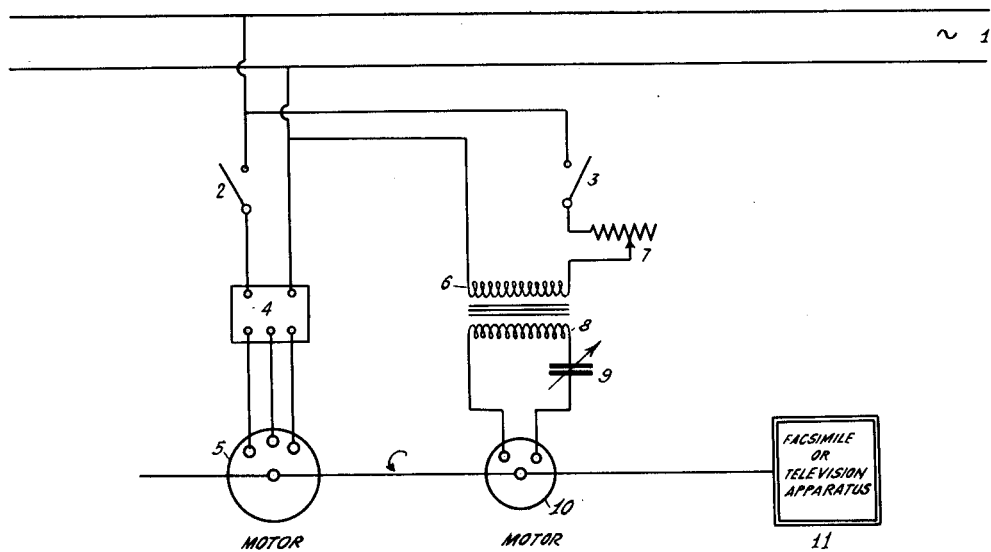
INVENTOR
AUGUST KAROLUS
BY
ATTORNEY Patented Apr. 28, 1931

1,802,470

UNITED STATES PATENT OFFICE

AUGUST KAROLUS, OF LEIPZIG, GERMANY, ASSIGNOR TO RADIO CORPORATION OF AMERICA, A CORPORATION OF DELAWARE

SYNCHRONIZING SYSTEM

Application filed May 28, 1929, Serial No. 366,575, and in Germany June 13, 1928.

The present invention is concerned with a method to insure synchronous running of driving motors used for high-speed picture transmission, television, tele-cinematography, and similar purposes comprising the use of the same light and power distribution network. It is known from the prior art that in picture telegraphy the driving motors provided for the revolving equipment at each end of the system may be connected with networks, as stated, and may be fed therefrom with the line frequency. In this scheme, however, it is found that when the picture transmission is effected at high speeds, most particularly, however, in television and tele-cinematography work, the marked fluctuations or hunting of the motors fed with current of such low frequency conduce to serious errors and disturbances both in the scanning and rebuilding or re-creation of the picture.

The progress inherent in the present invention consists in that an overtone of sufficient energy is first obtained from the low frequency of, say, 50 cycles, for examples, furnished from the supply network, and in that this overtone is thereupon used for the driving of synchronous motors. The latter may be able to furnish the entire driving power required for the equipment, or else they may be merely used for supplying a part of the power, for instance, in order to keep a main motor in step. One scheme would be to feed the latter with the normal 50 cycle current or any other provided frequency of the supply line and to feed with the ensuing overtone or higher harmonic a synchronous motor designed for a higher frequency coupled therewith or otherwise constructionally combined therewith.

For the production of such higher frequencies, fundamentally speaking, all such means may be resorted to as are suited for the multiplication of frequencies. It may be advisable to to utilize the saturation phenomena in iron-cored choke coils in order to obtain the desired frequency by the distortion of current and potential. In this scheme, tuning of the useful or load circuit to the desired frequency may be used for assistance.

The accompanying drawing shows an exemplification of the invention. 1 denotes the A. C. network furnishing in the usual way, say, A. C. of 50 cycles; 2 and 3 are switches, 4 a starter of known kind comprising the use of an artificial phase for the main motor 5 fed directly with 50 cycle current. The circuit closed by switch 3 contains the frequency-multiplication means consisting in this instance of a frequency changer 6 whose primary current can be regulated by rheostat 7. The secondary winding 8 of the iron-cored transformer together with the inductance of motor 10 and variable condenser 9 is tuned to an overtone, say, 500 cycles, and the division of rotor and stator of motor 10 is dimensioned for 500 cycles. Coupled with the joint shaft of 5 and 10 is the picture transmission or television apparatus or the like 11, which may be of any desired type and is therefore shown here merely schematically, and which it is desired to control.

It is to be recognized that various modifications and changes may be made in and to the system herein disclosed and illustrated, insofar as such changes fall fairly within the spirit and scope of the invention as set forth in the hereinafter appended claims.

Having now described my invention, I claim:

1. A method of maintaining synchronism between moving elements by use of energy directly supplied from power line distribution systems having a single distributed frequency which includes driving a rotating element from energy directly obtained from the power line, producing harmonics of the power line frequency, driving a second rotating element from the power line energy at said harmonic frequency, and maintaining said first named rotating element in proper synchronism by the driving force exerted on said second element.

2. A system for driving motors at synchronous speeds from power line distribution systems, having a single distributed frequency which includes a motor adapted to be driven directly from energy derived from the power supply line, a second synchronous motor connected on the shaft of said first motor, means for producing predetermined harmonics of said power line frequency, means for supplying said harmonic power line energy to said second motor for driving the same, and means provided by said second motor for maintaining said first motor in synchronism.

3. A system for synchronizing moving bodies directly from power line distribution systems having a single distributed frequency which includes a first motor, a second motor connected on the shaft of said first named motor, means for driving said first motor from energy directly derived from the power line distribution system energy, means for producing harmonics of the power line frequency energy, means for driving said second motor from said power line energy at a frequency of said produced harmonics, and means provided by said direct connected second motor for exerting a correcting force on said first motor for reducing hunting and the effect of line frequency fluctuation in said first motor.

AUGUST KAROLUS.